United States Patent [19]

Nishu et al.

[11] Patent Number: 4,576,059
[45] Date of Patent: Mar. 18, 1986

[54] SHIFT LEVER SUPPORT MECHANISM FOR TRANSMISSIONS

[75] Inventors: Mitsufumi Nishu, Chiryu; Kenji Takeuchi, Aichi; Masanori Sato, Nagoya; Ichiro Horiuchi, Chiryu; Katsuhiko Muramatsu, Toyota; Koji Kiryu, Anjo, all of Japan

[73] Assignee: Aisin Seiki Kabushiki Kaisha, Kariya, Japan

[21] Appl. No.: 572,843

[22] Filed: Jan. 23, 1984

[30] Foreign Application Priority Data

Feb. 4, 1983 [JP] Japan .................. 58-014455[U]

[51] Int. Cl.⁴ .......................... G05G 9/12; B25G 3/38
[52] U.S. Cl. ........................... 74/473 P; 74/473 R
[58] Field of Search ...................... 74/473 P, 473 R

[56] References Cited

U.S. PATENT DOCUMENTS 3,850,047  11/1974  Davis ................... 74/473 P
3,974,711   8/1976  Hurst ................... 74/473 R
4,333,360   6/1982  Simmons ................ 74/473 P

FOREIGN PATENT DOCUMENTS 0137428  9/1979  Fed. Rep. of Germany .... 74/473 P
2940129  4/1980  Fed. Rep. of Germany .... 74/473 P
 835799  5/1947  France .................. 74/473 R Primary Examiner—Carl Stuart Miller
Attorney, Agent, or Firm—Burns, Doane, Swecker & Mathis

[57] ABSTRACT

A shift lever support mechanism for a transmission comprises a shift lever having a partly spherical pivot body and a distal end extending from the partly spherical pivot body for engagement with a gear shifting actuator shaft of the transmission, a retainer member adapted to be mounted on the transmission casing and having a bore accommodating the spherical pivot body therein, the retainer member including a partly spherical seat supporting the partly spherical pivot body, the retainer member having a central opening through which the distal end extends, resilient means disposed in the bore in the retainer member for normally urging the partly spherical pivot body against the partly spherical seat, and a boot mounted on the shift lever and the retainer member and defining a space therein communicating with the bore in the retainer member. The retainer member has an escape passage defined in a wall thereof adjacent to the partly spherical seat for communication between the space and the interior of the transmission casing. With this arrangement, the space in the boot and the interior of the transmission casing are equally pressurized through the escape passage. No oil is filled in the boot space and will not leak out of an air vent in the boot.

4 Claims, 4 Drawing Figures

SHIFT LEVER SUPPORT MECHANISM FOR TRANSMISSIONS

BACKGROUND OF THE INVENTION

The present invention relates to a mechanism for supporting the shift lever of a transmission.

Prior tranmission casings suffer from an increased pressure therein due to a temperature rise of the oil during operation of the transmission. The pressure buildup in the transmission casing is liable to cause the oil to leak or blow out, or the oil seal to be detached. Known solutions include an air bleeder and an air vent for reducing the pressure in the transmission casing. However, the air bleeder makes the transmission system costly, and the air vent fails to provide sufficient pressure reduction.

SUMMARY OF THE INVENTION

It is an object of the present invention to provide a shift lever support mechanism for transmissions which has an excape passage communicating with the interior of a transmission casing and the interior of a shift lever cap boot for reducing the pressure in the transmission casing.

According to the present invention, a shift lever retainer housing accommodating a partly spherical pivot body on a partly spherical seat has an escape passage defined in a wall thereof and communicating with a space in a boot mounted on a shift lever and the shift lever retainer housing and with the interior of a transmission casing. With this arrangment, the space in the boot and the interior of the transmission casing are kept at the same pressure through the escape passage even when the oil pressure in the transmission casing is increased during operation of the transmission. Since the interior of the transmission casing and the space in the boot are held in communication with each other throught the escape passage, there is no tendency of oil in the transmission casing to go in atomized state through any gap between the partly sperical pivot body and seat, to be cooled into a liquid phase again. Therefore, no oil is filled in the boot and leaks through joints at the boot. Since no oil goes up as atomized form into the boot, or any oil splashed into the escape passage will soon flow out downwardly, no oil is filled in the boot, and hence will leak out of an air vent defined in the boot. As there is no air bleeder provided, and no groove is defined in contacting surfaces of the partly spherical pivot body and seat, with the area of contact of the pivot body and seat remaining the same as that of the prior art, the feeling that the driver has in gear shifting operation is not adversely affected.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
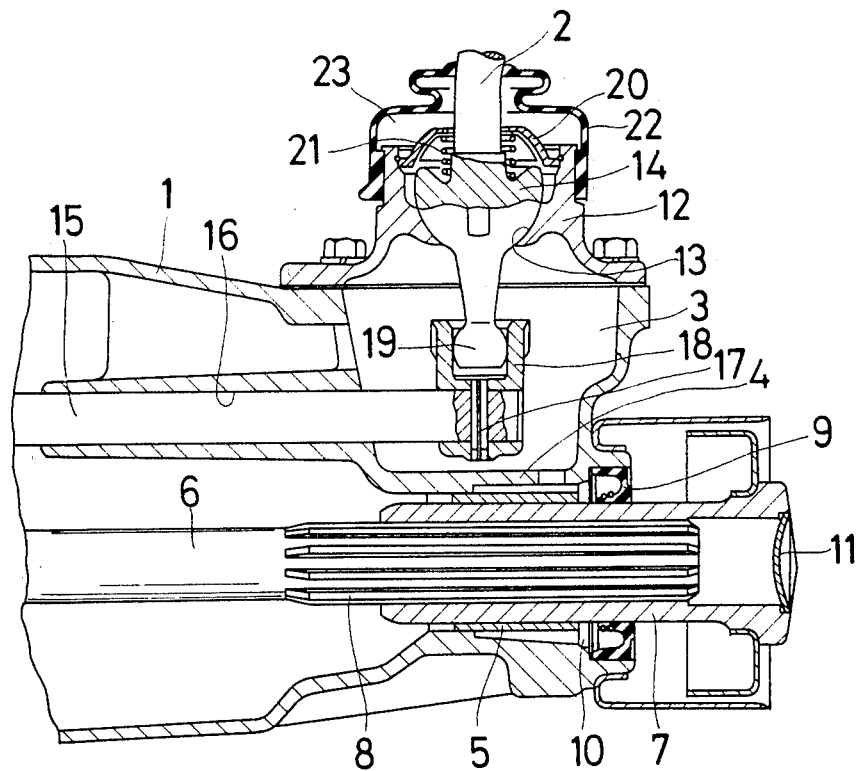
FIG. 1 is a fragmentary vertical cross-sectional view of an extension casing of a conventional transmission.

FIG. 1 illustrates in vertical cross section a rear end portion of an extension casing of a conventional transmission. The extension casing 1 includes a rear chamber 3 accommodating therein a lower end of a shift lever 2 and has a bottom wall 4 adjacent to which a rear bushing 5 is force-fitted in the rear end of the extension casing 1. A transmission output shaft 6 extends through the extension casing 1, and supports on a rear end thereof a sleeve yoke 7 connected for co-rotation to the output shaft 6 through splines 8 and supported in the rear bushing 5.

A space 10 behind the rear bushing 5 is sealed by an oil seal 9. Lubricating oil is prevented by a plug 11 from leaking out of the extension casing 1 along the splines 8. A shift lever retainer housing 12 is fastened to the extension casing 1 above the chamber 3 and has a bore accommodating a partly spherical body 14 therein and a partly spherical central seat 13 on which the partly spherical pivot body 14 integral with the shift lever 2 is swingably supported. A transmission actuator shaft 15 extends parallel to the output shaft 6 in the extension casing 1 and is slidably supported in a hole 16 extending from the chamber 3 forward toward the transmission.

A shift lever support 18 is fixed by a pin 17 to the rear end of the actuator shaft 15 and receives therein a ball 19 on the lower distal end of the shift lever 2 which extends downwardly through a central opening in the shift lever retainer housing 12. Thus, movement of the shift lever 2 can be transmitted through the actuator shaft 15 to gears (not shown) of the transmission for gear shifting and selecting operation. A coil spring 21 is disposed bewteen an upper surface of the spherical body 14 and a cap 20 secured to the shift lever retainer housing 12 for normally urging the spherical body 14 to move downwardly. A boot 22 has ends attached to the shift lever 2 and the shift lever retainer housing 12 and covers an upper portion of the shift lever retainer housing 12 while defining a space 23 therein.

When the transmission is in operation, the temperature of the oil in the casing 1 is increased due to stirring motion of the transmission gears in the oil or friction between various coacting sliding parts, causing an increased pressure in the casing 1 and the chamber 3.

As the pressure in the chamber 3 builds up, the oil tends to leak or blow out through the gasket or joints at the boot 22, or the oil seal 9 is likely to be dislodged. Oil leakage from the transmission results in oil shortage therein, with the consequence that serious troubles such as seizure between sliding gear surfces may occur.

These problems can be overcome by reducing the pressure in the casing 1. Prior solutions have been to provide an air bleeder in the casing 1 or an air vent in the boot 22. The installation of the air bleeder however entails an increase in the cost. The air vent in the boot 22 fails to lower the pressure in the casing 1 sufficiently.

Figure 2:
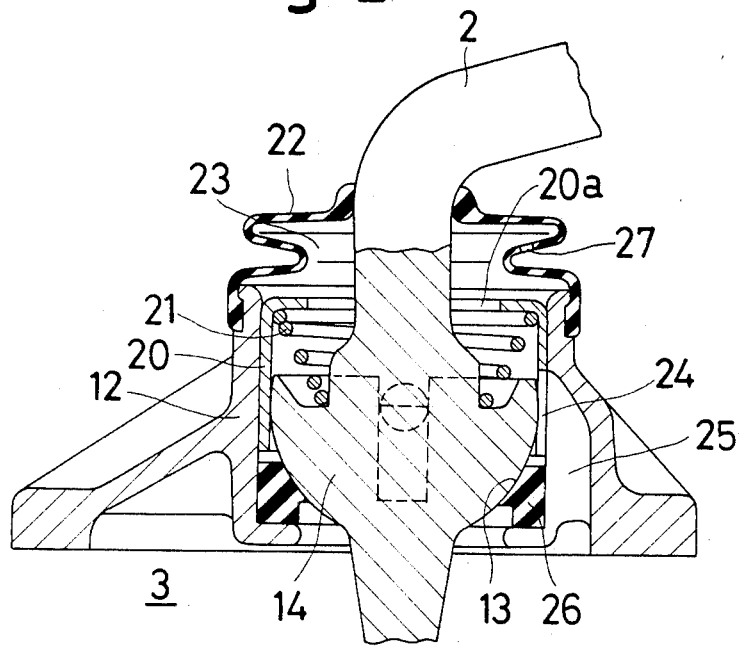
FIGS. 2 and 3 are fragmentary vertical crosssectional views of a shift lever support mechanisms according to embodiments of the present invention.

A shift lever support mechanism according to an embodiment of the present invention will be described with reference to FIG. 2. A shift lever 2, a chamber 3, a partly spherical seat 13, a spherical body 14, a spring 21, a shift lever cap boot 22, and a space 23 are identical or substantially identical to those illustrated in FIG. 1, and will not be described in detail.

Figure 4:
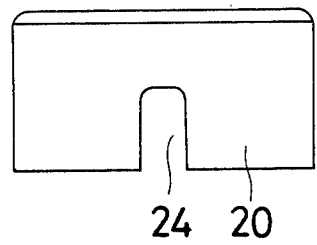
FIG. 4 is a front elevational view of a shift lever cap employed in each of the shift lever support mechanisms shown in FIGS. 2 and 3.

A shift lever cap 20 has a slot 24 of a rectangular shape as shown in FIG. 4 or of any other suitable shape defined in a cylindrical side wall. A shift lever retainer housing 12 has a vertical escape passage 25 communicating with the slot 24 and defined in an inner side surface facing the spherical body 14 and a seat body 26 providing the partly spherical seat 13. The space 23 in the boot 22 is therefore held in communication with the chamber 3 through the escape passage 25, the slot 24, and a hole 20a defined in the shift lever cap 20. The shift lever cap boot 22 has an air vent 27.

With the chamber 3 and the space 23 held in mutual communication through the escape passage 25, the space 23 in the boot 22 and the interior of the transmission casing 1 are kept at the same pressure through the escape passage 25 even when the oil pressure in the transmission casing 1 is increased during operation of the transmission. Furthermore, no oil is forced to be atomized and go upwardly through the escape passage 25 even when the pressure in the chamber 3 is increased. Even if the oil is atomized, goes up, and is cooled into a liquid form, or the oil is splashed through the escape passage 25 into the space 23, the oil is allowed to flow down the escape passage 25 without being retained and filled in the space 23. Therefore, there will be no oil leakage through the air vent 27 in the shift lever cap boot 22 or through joints.

Figure 3:
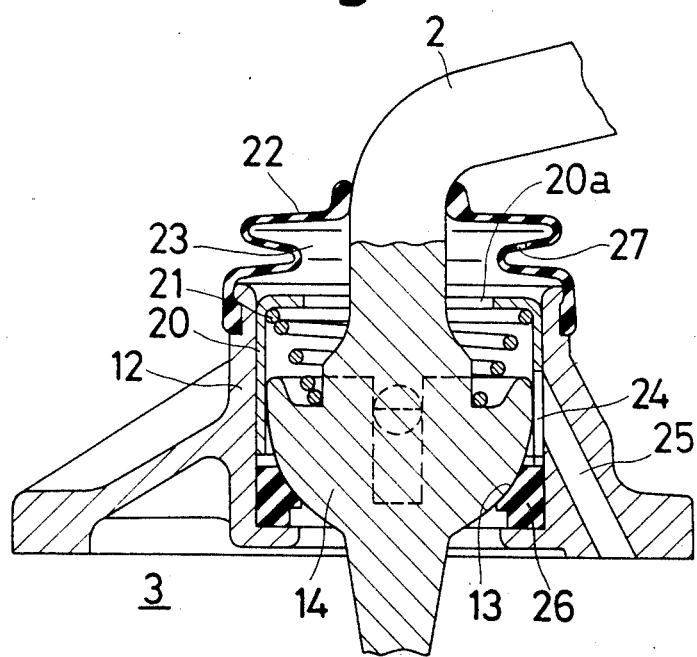

FIG. 3 shows a shift lever support mechanism according to another embodiment in which an oblique escape passage 25' is defined in a wall of the shift lever retainer housing 12 in communication with the slot 24 and the chamber 3.

Although certain preferred embodiments have been shown and described, it should be understood that many changes and modifications may be made therein without departing from the scope of the appended claims.

What is claimed is:

1. A shift lever support mechanism for a transmission having a transmission casing and a gear shifting actuator shaft, comprising:
   (a) a shift lever having a partly spherical pivot body and a distal end extending from said partly spherical pivot body for engagement with the gear shifting actuator shaft;
   (b) a retainer member mountable on the transmission casing and having a bore accommodating said spherical pivot body therein, said retainer member including a partly spherical seat supporting said partly spherical pivot body, said retainer member having a central opening through which said distal end extends;
   (c) resilient means disposed in said bore in said retainer member for normally urging said partly spherical pivot body against said partly spherical seat;
   (d) a boot mounted on said shift lever and said retainer member and defining a space therein communicating with said bore in said retainer member; and
   (e) said retainer member having a passage defined in a wall thereof adjacent to said partly spherical seat for communication between said space and the interior of the transmission casing.

2. A shift lever support mechanism for a transmission having a transmission casing and a gear shifting actuator shaft, comprising:
   (a) a shift lever having a partly spherical pivot body and a distal end extending from said partly sphericl pivot body for engagement with the gear shifting actuator shaft;
   (b) a retainer member mountable on the transmission casing and having a bore accommodating said spherical pivot body therein, said retainer member including a partly spherical seat supporting said partly spherical pivot body, said retainer member having a central opening through which said distal end extends;
   (c) resilient means disposed in said bore in said retainer member for normally urging said partly spherical pivot body against said partly spherical seat;
   (d) a boot mounted on said shift lever and said retainer member and defining a space therein communicating with said bore in said retainer member; and
   (e) said retainer member having a passage defined in a wall thereof adjacent to said partly spherical seat for communication between said space and the interior of the transmission casing wherein said resilient means comprises a cap mounted in said retainer member and having a slot communicating with said passage, and a coil spring acting between said cap and said partly spherical pivot body.

3. A shift lever support mechanism according to claim 1, wherein said retainer member comprises a retainer housing and a seat body defining said partly spherical seat.

4. A shift lever support mechanism according to claim 2, wherein said retainer member comprises a retainer housing and a seat body defining said partly spherical seat.

* * * * *